Fig. 1.

Fig. 5.
CORRECTION

INVENTOR
R.B. BLIZARD
BY
ATTORNEY

United States Patent Office 2,887,783
Patented May 26, 1959

2,887,783

AZIMUTH REFERENCE DEVICE

Robert B. Blizard, Stamford, Conn., assignor to Sperry Rand Corporation, a corporation of Delaware Application December 24, 1953, Serial No. 400,178

11 Claims. (Cl. 33—226)

This invention relates to an instrument of the gyroscopic compass type specially designed for quickly obtaining an azimuth reference or base line in much less time than required for a standard gyro-compass to settle. Such a compass would have particular application to each mobile gun of a battery comprising a plurality of such guns. It is the present practice to control battery gunfire from one master position, i.e., for all guns to be positioned with reference to the bearings obtained at a master position. Therefore, each gun must know its position with respect to the master and to obtain this, it is customary to stake out direction markers for guns, the procedure requiring usually a half hour or more after arrival of the guns at the destination before the battery can open effective battery fire upon the target. According to the present invention, I propose to eliminate this time consuming and difficult procedure by providing each gun with its own gyro-compass so that the master station can transmit the bearings of the target with reference to the meridian (suitable allowance being made, of course, for parallax corrections). Unfortunately, the standard gyro-compass cannot be used successfully for this purpose because it requires between one and two hours or more to settle on the meridian after starting up at a random position, so that if a standard gyro-compass is employed for the purpose, no time would be saved in getting the battery into operation.

My invention, therefore, is directed toward devising an instrument of the gyroscopic compass type which can be brought to and settled on the meridian in a matter of a few minutes, after which it will continue to hold the meridian with extreme accuracy in spite of the shocks of gunfire. Other objects of the invention are to improve gyroscopic instruments of this type so as to be virtually unaffected by the jolts and jars of the gun carriages and other rough riding vehicles.

More briefly stated, the specific object of the invention is to provide a highly accurate azimuth reference device for use as a component part of an improved fire control system for use in the turret of a self-propelled gun, but of course, the invention has other uses and ramifications.

As the basic reference device, I employ a gyroscope of the gyro-compass type but which is operated as a free gyroscope during the time that the true meridian is being found by my novel system of measuring and integrating the rate of tilt of such free gyroscope for a predetermined short interval.

To aid in the understanding of the theory of operation of this portion of the invention, the following symbols are employed hereinafter:

$\lambda$ = Latitude of the gyro
$\omega$ = Rotational velocity of the earth
$\omega_H$ = The horizontal component of the earth's rotational velocity at the latitude ($\lambda$), i.e., the tangential component of the earth's angular velocity vector, herein abbreviated as the horizontal earth rate $\omega_V$ = The vertical component of the earth's rotational velocity at latitude $\lambda$, i.e., the component of the earth's angular velocity which is normal to the earth's surface at latitude $\lambda$, herein abbreviated as the vertical earth rate
$\theta$ = Inclination angle of the gyro spin axis to the horizontal
$\phi$ = Azimuth angle between the gyro spin axis when horizontal and the meridian, and is also referred to herein as the error angle
$\dot{\theta}$ = Rate of change of the inclination angle from the horizontal because of the earth's rotation, i.e., rate of apparent gyro movement due to the horizontal component of the earth's rotation ($\omega_H$)
$\dot{\phi}$ = Rate of change of the azimuth angle because of the earth's rotation, i.e., rate of apparent gyro movement due to the vertical component of the earth's rotation ($\omega_V$)

From the above definitions, it will be at once apparent that $$\omega_H = \omega \cos \lambda \quad (1)$$
$$\omega_V = \omega \sin \lambda \quad (2)$$

Because the gyro possesses complete freedom, its spin axis will not move with respect to inertial space, but will, as stated before, appear to rotate about its horizontal and vertical axes.

This apparent motion or angular rate of the spin axis as the earth revolves is:

$$\dot{\theta} = \omega_H \sin \phi \quad (3)$$
$$\dot{\phi} = \omega_V \cos \theta \quad (4)$$

If $\phi$, the rate of change of heading, can be made equal to zero, then $\cos \theta$ becomes equal to one and Equation 4 reduces to:

$$\dot{\phi} = \omega_V \quad (5)$$

If $\dot{\phi}$, the rate of change of heading, can be made equal to zero, then $\phi$ will be a constant. For the values of $\phi$ ($\pm 6°$ maximum) considered here, $\sin \phi = \phi$ in radians within 0.02%. From Equations 3 and 1:

$$\phi = \frac{\dot{\theta}}{\omega_H} = \dot{\theta} \frac{\sec \lambda}{\omega} \text{ or } \frac{\dot{\theta}}{\omega \cos \lambda} \quad (6)$$

which may also be written $$\dot{\theta} = \frac{\omega \phi}{\sec \lambda}$$

Equations 6 show that if the gyroscope is not on the meridian, the gyro axis will tilt at a constant rate $\dot{\theta}$ (at any given latitude) proportional to the angle of deviation from the meridian $\phi$, providing this angle can be held constant during the measuring interval, that is, providing the effect of the earth's rotation ($\dot\omega$) can be eliminated, for tilts up to $\pm$thirty minutes.

For tilts up to $\pm 30'$, $\cos \theta$ is unity within 0.004%. Equation 5 therefore is accurate within the required limits of the device, and $\dot\phi$ can therefore be easily made zero by introducing a constant torque counteracting that due to $\omega_V$.

Since the latitude is known, it follows that by determining $\dot{\theta}$ or the tilt per unit time the error angle $\phi$ may be computed. To measure the tilt rate, I employ a sensitive damped pendulum, preferably the same pendulum as I employ to generate the meridian-seeking torque of the compass when operating as a true gyro-compass, and obtain the average tilt angle per unit time, or the average tilt rate over a predetermined time interval. Since the purpose of the invention is to secure quick finding of the meridian, and since the rate of tilt of the gyro is small, I have devised an employ a very sensitive pendulum capable of detecting and generating a signal upon a tilt on the order of one second.

Because of the extreme sensitive of the pendulum, small accelerations other than gravity will also serious affect the pendulum. Such accelerations are produced by more or less unpredictable small motions or vibrations of the vehicle when standing still and, therefore, can be classed as random motions. It is from a consideration of the output of the pendulum in the presence of such random motions that my method of measuring the rate of tilt $\dot{\theta}$ is derived.

Because of the random nature of the output of the pendulum, the calculation of the error is improved by introducing a weighting function which allows certain selected sections of the measuring interval to contribute more to the total integral than other sections and thus to be more important to the average. By choosing an odd function as the weighting function, its own over-all contribution to the integral can be made zero. Such random motions in a parked vehicle have been found to be in the nature of a series of very short and rapid motions, and therefore, resemble "noise" as this expression is used by radio technicians. By mathematical investigation of the curves and equations involving averaging by the root mean square method, I have determined that a sine curve as a weighting function gives a very close approximation to the best theoretical curve to use and, therefore, I employ a sine curve as a preferable form of weighting function to be employed.

Since the rate of tilt ($\dot{\theta}$) is proportional to the azimuth error ($\phi$) and inversely proportional to the secant of the latitude (sec $\lambda$), I derive from these factors a signal which displaces the synchros in the computer through an angle representing the computed error arising during the evaluation. At the end of the evaluation period, a switch is thrown connecting the synchros in the computer to those on the gyro, thereby producing an error signal in case the positions of the synchros do not agree. This signal causes a strong torque to be applied about the horizontal axis of the gyro until the synchros at the gyro and in the computer agree. At the same time, a strong torque is also applied about the gyro's vertical axis, controlled from the pendulum to again level the gyro. The gyro, therefore, has now been set upon the meridian in a level position and is ready to resume operation as a gyro-compass, which is done by throwing another switch.

Referring to the drawings in which the invention is illustrated somewhat diagrammatically.

The gyro-compass employed is preferably of the type in which the meridian-seeking and damping torques are derived from electrical signals controlled by a small gravitational factor such as a damped pendulum or liquid level, a gyro-compass of such type being disclosed in general in the prior copending applications of Frederick D. Braddon, S.N. 261,508, filed December 13, 1951 for Gyroscopic Instruments, now U.S. Patent 2,729,107 dated January 3, 1956, and Vacquier, Cope and Proskauer, S.N. 261,524, filed December 13, 1951 for Control Systems for Gyroscopic Instruments, now U.S. Patent 2,729,108, also dated January 3, 1956. Such a compass is illustrated diagrammatically in Fig. 1, the gyro rotor 1 being shown mounted for spinning about a normally horizontal spin axis 2 in rotor case 3, which in turn is mounted for freedom about a horizontal axis 3' in vertical ring 4. The vertical ring in turn is mounted for orientation about a vertical axis 5 within the follow-up or phantom ring 6 which is driven by an azimuth motor 7 geared to azimuth gear 7' on the phantom ring 6 and excited from an electrical pick-off 8 between the vertical ring 4 and phantom ring 6. Suitable coarse and fine synchro transmitters 9 and 9' are driven from the azimuth gear 7' to transmit heading information to repeater compasses and, in the correction mode of operation, to cooperate with synchro control transformers 40, 42 in the integrator 30. An electrical or azimuth torquer for imparting meridian-seeking torques to orient the compass is represented at 10 and a damping or levelling torquer for applying a torque about the vertical axis is represented at 11.

The primary source of supply is single phase A.C. rectifiers 112 and 113 being shown in some instances to operate solenoids. In a few other instances, D.C. is employed where so marked. Ground returns are shown to simplify the diagrams.

Figures 6, 8:
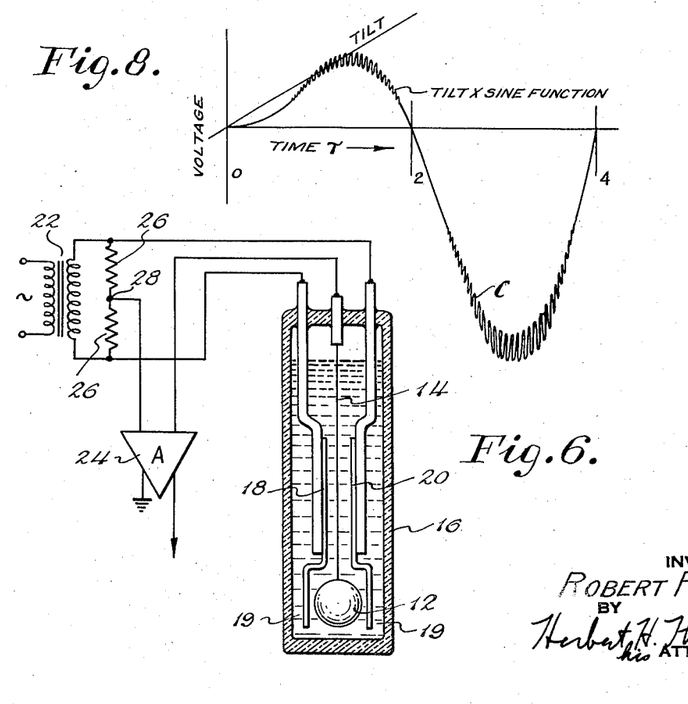
Fig. 6 is a side elevation and wiring diagram of the pendulous controller.
Figs. 7 and 8 are two diagrams showing how a sine curve is used as a weighting function in the determination of tilt rate, Fig. 8 illustrating a combination of curves A and B of Fig. 7 and showing that the curves are not affected by the starting point in the cycle, if one complete cycle is employed.

The preferred form of pendulum or gravitational controller is shown in Fig. 6 and comprises a pendulum bob 12 of insulating material suspended by a fine wire or filar element 14 within a tube 16. On the north and south sides of the pendulum, as mounted on the gyro sensitive element, are two parallel metal plates or strips 18 and 20, the tube being filled with an electrolyte of predetermined viscosity to damp the pendulum. Preferably, the tilt of the pendulum is limited by the offset extension 19 from the strips to about ±30 minutes so that the pendulum is not allowed to tilt with respect to the plates more than the amount normally encountered in a meridian-seeking cycle, thereby reducing ballistic deflection and preventing undue disturbance during gunfire recoil. The plates and filar element are placed in a bridge circuit, as shown in Fig. 6 of the drawings, alternating current from transformer 22 being supplied to the two plates, and an output amplifier 24 is connected between a mid-point 28 on resistors 26 and the filar element 14 so that the filar element acts as a probe of the potentials at a point between the two plates which is displaced with tilt and a voltage is thereby applied to the amplifier whose magnitude is a measure of the magnitude of the tilt of the gyro spin axis from the horizontal and whose phase varies with the direction of such tilt.

Figure 1:
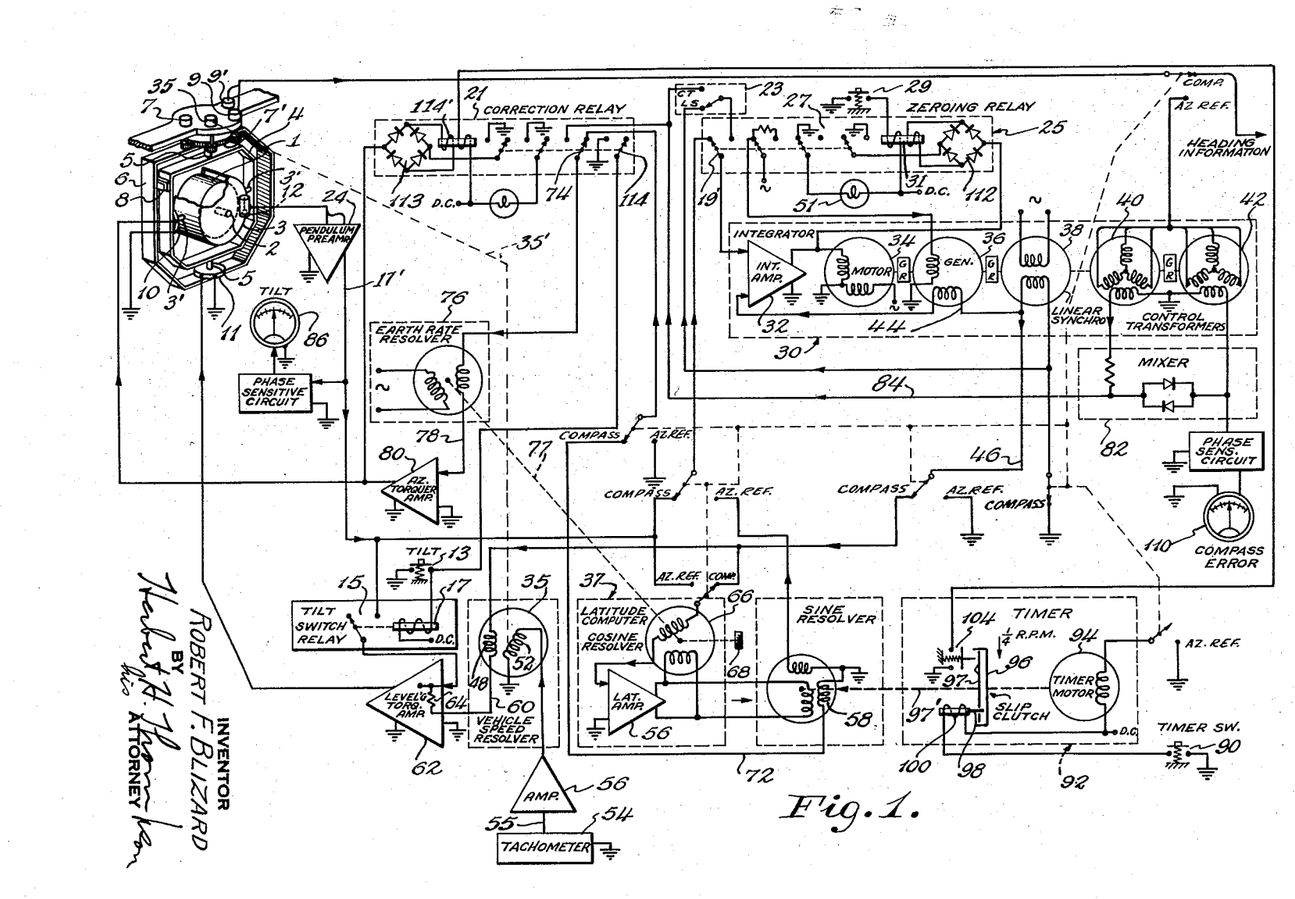
Fig. 1 is a block wiring diagram of the complete azimuth reference system which is adapted to be operated in some four different modes.

Because of the difficulty in following the wiring connections employed for each of the four modes of operation of the device, I have shown by separate diagrams, Figs. 2, 3, 4 and 5, one for each mode of operation, only those connections active during each mode and will first describe the operation of the device as a gyro-compass which is the normal mode and the one in operation both at the beginning and the end of the complete cycle of operation of the system. Fig. 1, being a complete wiring diagram showing the switching required to effect change from one mode to another, may be used as a reference or composite showing of the over-all system.

Figure 2:
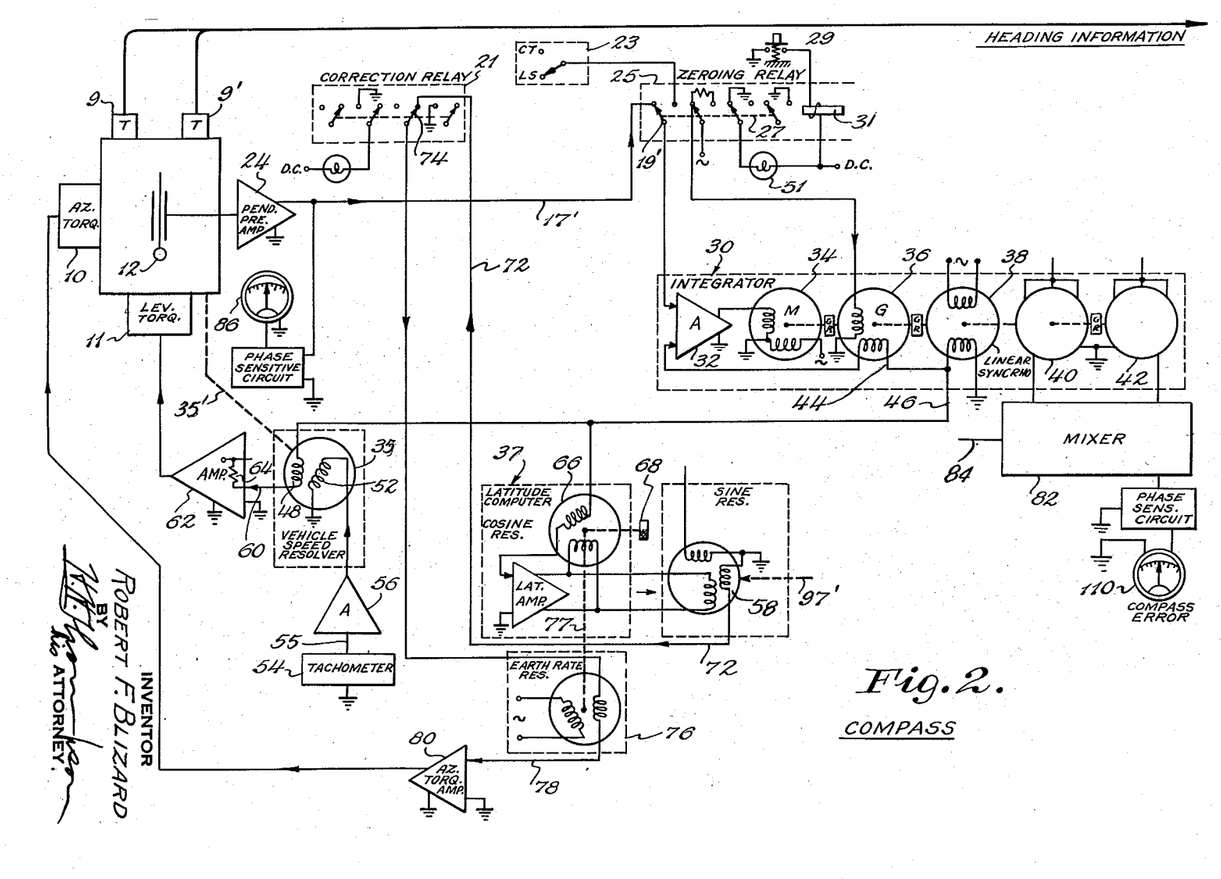
Fig. 2 is a similar diagram of the connections employed when the azimuth reference device is operated as a true gyro-compass. This is the final stage of operation but also is preferably employed as the first stage of the operation, that is, the device is preferably operated as a gyro-compass while the gun is moving up to position so that when the gun arrives at its position the gyro will be running and in full operation and usually positioned within about five or six degrees of the meridian.

When operating in the gyro-compass mode, the double throw switches marked "compass" and "azimuth reference" in Fig. 1 are all placed in the "compass" position as shown, the circuits then effective being substantially as shown in Fig. 2. In addition, the gang switches 27 of the zeroing relay 25 and the gang switches of the correction relay 21 are both spring-biased to the position shown, and the switch 23 is down, that is, in the L.S. or linear synchro position. The output signal from the pendulous controller 12 (Figs. 1 and 2) under these conditions is fed through lead 17′, through the first switch 19′ of the zeroing relay 25, and into an integrator 30. This unit, when the device is operating as a gyro-compass, operates as a highly damped servo or low pass filter to smooth the output of the pendulum so that the resultant signal is not unduly affected by temporary jolts and jars, thus supplementing the averaging action of the viscous electrolyte in the pendulum.

The integrating unit 30 is shown as comprising an amplifier 32, the output of which rotates motor 34 which drives the following elements:

(1) A "speed" or induction generator 36, generating an alternating voltage varying in magnitude with its speed and varying in phase with its direction of rotation
(2) A linear synchro 38 which produces an output signal in lead 46, which varies linearly with the angular position of its armature over a large angular range (approximately ±85°)
(3) Coarse and fine synchro control transformers 40 and 42, which transformers, however, perform no function during gyro-compass operation of Fig. 2

A feedback connection 44 is provided from the output 46 of linear synchro 38, to which is added the speed signal from the speed generator 36 or tachometer, the resultant being fed back into amplifier 32 to oppose the signal from the pendulum, so that the final smoothed output signal of the linear synchro 38 appearing on lead 46 represents the smoothed or integrated tilt of the gyro with respect to the pendulum.

This signal is used not only to control the azimuth or meridian-seeking torquer 10, but also to control the levelling torquer 11 for damping purposes, certain corrections to prevent known systematic errors in gyro-compasses being introduced before application of these torquers. Most of these corrections vary with a function of an angle; such as the sine or cosine of the ship's course φ or latitude λ and the corrections are, therefore, conveniently introduced by means of transformer resolvers of known form and having at least one winding rotatable through that angle so that the output varies as the sine or cosine of the angle between the windings.

The northerly speed error of the gyro-compass is prevented from arising in my system by supplementing the levelling torque signal appearing in lead 46 by a signal proportional to the northerly component of the vehicle's speed if the compass is used for navigation purposes. This is shown as accomplished by feeding into one winding 48 of the vehicle speed resolver-transformer 35, the signal from lead 46 and feeding into the second winding 52 thereof a signal proportional to the speed of the vehicle which is represented as set in from tachometer 54 producing a vehicle speed signal in lead 55 and amplifier 56. One of said windings is rotatable from the follow-up ring 6 of the compass which fact is represented by the dotted line 35′ so that the output of the resolver 35 represents a combination of the tilt signal from linear synchro 38 modified by a signal proportional to the northerly component of the vehicle's velocity. The resolver output signal appears on lead 60 and is fed into amplifier 62 through a reducing resistor 64, the output of which is applied to the levelling torquer 11.

Similarly, the signal in lead 46 is also fed into the azimuth torquer 10 but is first modified by a latitude computer 37 containing cosine resolver 66 which is used at this time to keep the period constant for all latitudes which is done by generating a signal for the azimuth torquer which modifies or alters the pendulum output as a function of the secant of the latitude (sec λ) by virtue of the feedback connection around the latitude amplifier 56 as taught in applicant's assignee's patent from Harris, 2,546,156 dated March 27, 1951. Therefore, the signal on lead 46 is shown as fed into one portion of the resolver transformer 66, while the other winding is set in accordance with latitude as by adjusting knob 68. The output is then led to one input winding of the sine-cosine resolver 58, the cosine winding of which merely acts as an ordinary fixed transformer in the compass cycle of operation. The output from this cosine winding appears on lead 72 passing through switch 74 in the correction relay 21 and thence into earth rate resolver 76 by which another correction is introduced for the purpose of adding a torque which varies with the sine of the latitude (Equation 2) to cause the compass to precess in azimuth at a rate which keeps it on the meridian in spite of changes in rate of tilt which varies with the latitude. Therefore, the same knob 68 may also set the rotatable element of the earth rate resolver 76 as represented by dotted line 77, it being understood that the supply to the primary winding of this transformer is kept proportional to ω. The output signal appearing on lead 78 is shown as passing through amplifier 80 to the azimuth torquer 10. During this period, therefore, the compass operates as a very accurate gyro-compass resembling in many respects the gyro-compasses described in the aforesaid patents of Braddon, and of Vacquier, Cope and Proskauer.

Figure 3:
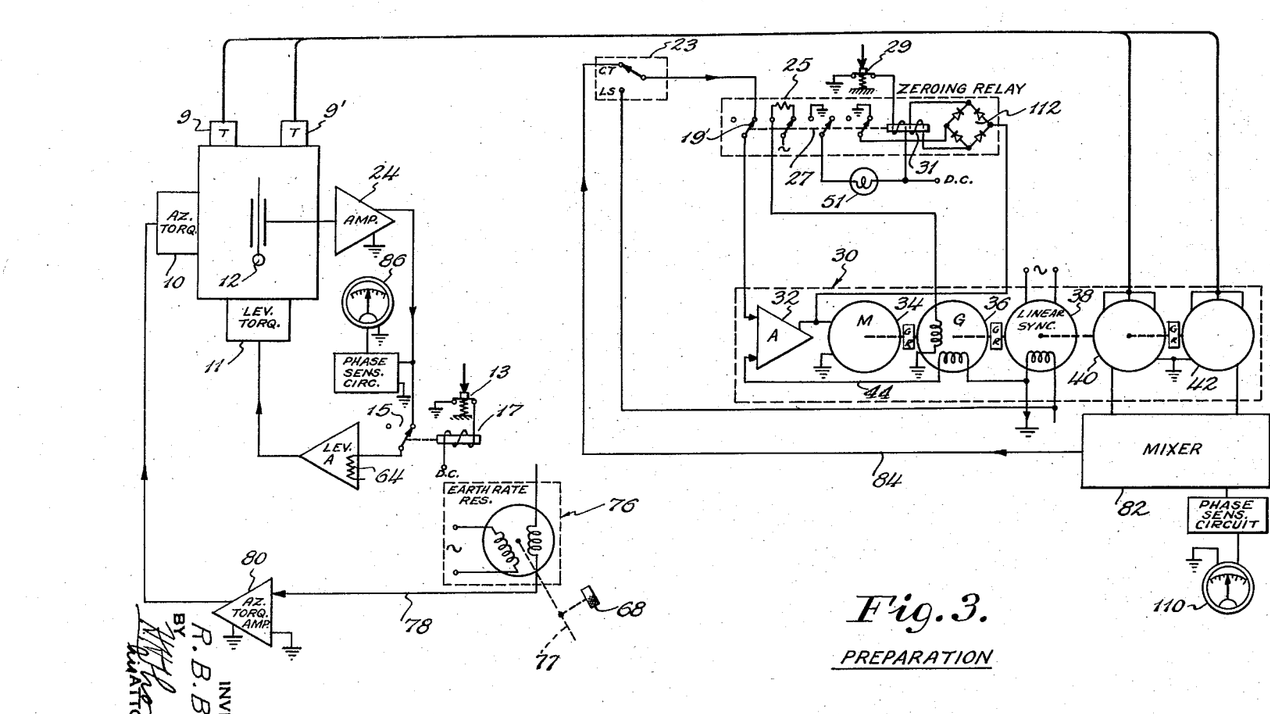
Fig. 3 represents the several elements as connected during what is known as the preparation period, which is started immediately after the gun has assumed its position in the battery and is stationary.

It is now assumed that the gun has arrived at approximately its proper position in the battery and the compass is on the meridian within five or six degrees ± error. If at this time the gyro-compass appears to be off the meridian by more than this amount by comparison with a magnetic compass, it is preferably reset by hand within the aforesaid limits. It is now desired to bring the compass upon the meridian in the shortest possible time, that is, without waiting for the compass to settle on the meridian under its normal damping control. Not only is such a settling operation very slow but it would be disturbed and retarded by the jarring of the gun, even though stationary, due to gunfire from adjacent turrets and to the running of the gun carriage engines, etc. The proper switches are, therefore, closed to place the compass in the preparation mode, at which time the system is set up for the first setting cycle as shown in Fig. 3.

For this purpose the following switches are operated. The multiple ganged switches shown at various places in Fig. 1 are moved from the compass position to the "azimuth reference" position, thus opening the contacts marked "compass" in Fig. 1 and closing the contacts marked "azimuth reference." At the same time the switch 23 is moved from L.S. (linear synchro) to the C.T. (control transformer) position. Push button 13 is also closed to excite solenoid 17 which throws switch 15 to the right to apply to the levelling torquer 11 a strong signal from the pendulum, the purpose being to quickly level the gyro. Switch 13 is held closed until the levelling signal disappears, i.e., until levelling meter 86 reads zero, whereupon the switch is released and the levelling torquer is deenergized. A second push button 29 is also momentarily depressed which excites the solenoid 31 in the zeroing relay 25 which throws the gang switches into the position shown in Fig. 3. The solenoid 31 is provided with a hold-in circuit connected to the rectified output of the amplifier 32 in the integrator 30 so that the switches remain in the position shown in Fig. 3 until this signal disappears. Under these conditions, the control transformers 40 and 42 are connected to the coarse and fine transmitters 9, 9′ on the compass so that signals are generated proportionally to their disagreement. The outputs thereof are mixed in the coarse-fine mixer 82 to furnish a single signal to lead 84, through the contact C.T. in switch 23 and the first contact in the zeroing relay 25, and back to the amplifier 32, thus constituting a servo loop which serves to align the orientation of fine and coarse control transformers 40, 42 with the azimuthal orientation of the gyro spin axis. A mixer suitable for use herein is shown in the patent to McCoy and Kusto No. 2,620,441, dated December 2, 1952 for Electronic Signal Mixers. As soon as, however, the signal disappears in the output of amplifier 32, solenoid 31 becomes deenergized, indicator 110 reads zero, showing synchronization, and the four switches are moved to the left in Fig. 3 whereupon the signal lamp 51 is lighted, as shown in Fig. 4, to show the preparation period or mode is completed and the device ready for the computation period or mode of operation.

The correction for vertical earth rate $\omega_V$ is still retained in the preparation period (as it is in all phases) so that the gyro azimuth error will remain constant in spite of the earth's rotation during the preparation and computation periods (see Equation 6). Therefore, if any gyro tilt appears, it should be due solely to the compass being off the meridian. At the end of the preparation cycle and the beginning of the computation cycle, the gyro is level, near the meridian, and operating as a free gyro corrected for the vertical earth's rate component.

Figure 4:
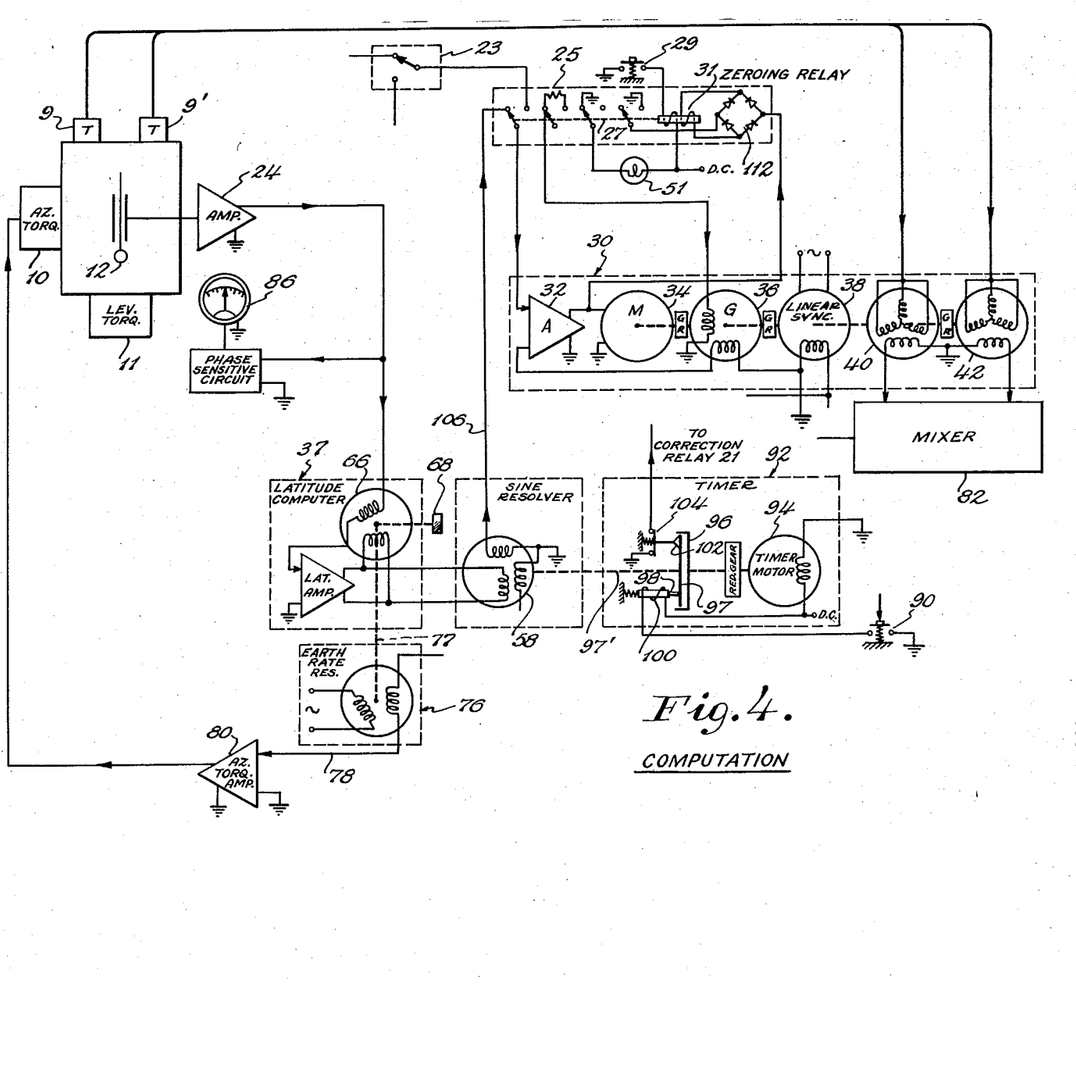
Fig. 4 is a similar block diagram showing the connections for the several elements during the computation or evaluation period, during which period the rate of tilt is determined.
Figure 5:
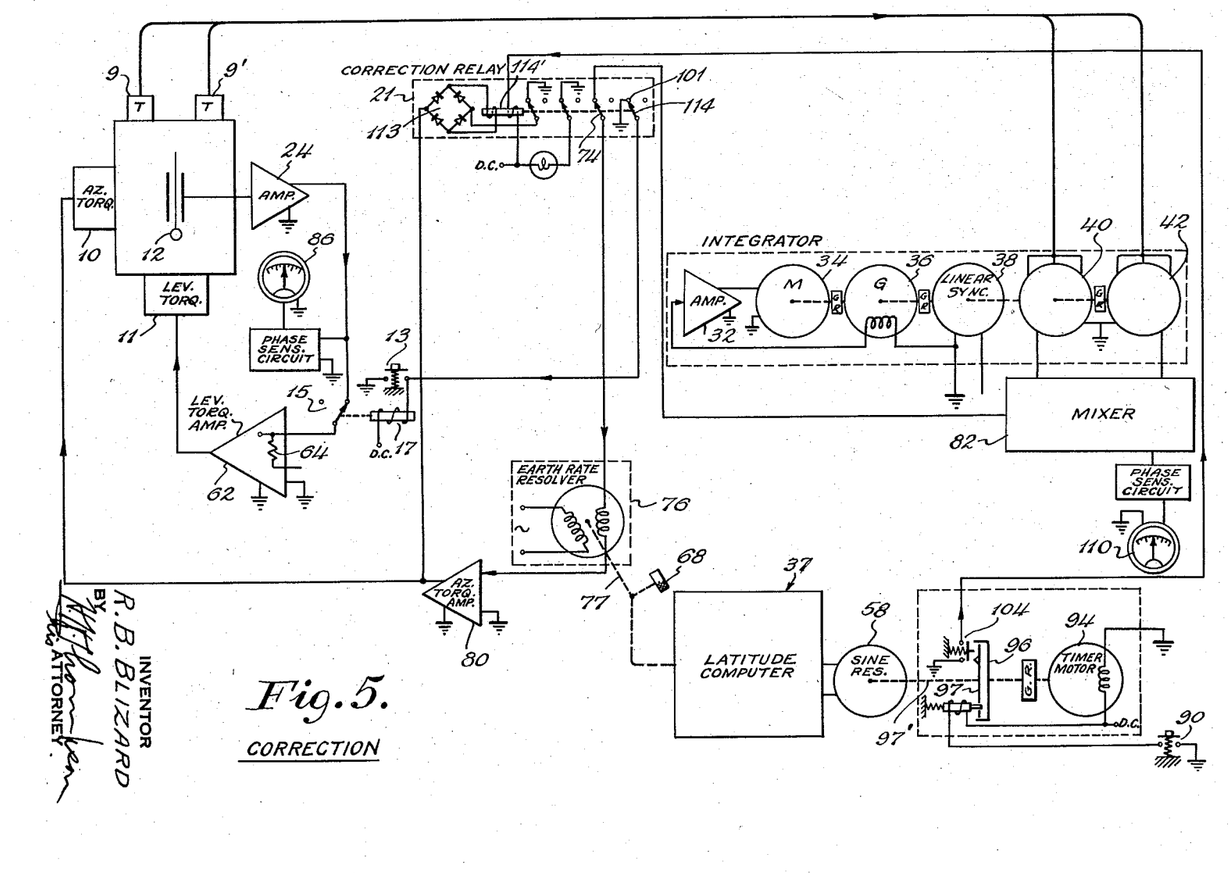
Fig. 5 is a similar block diagram of the connections for the elements during the correction period, at which time a torque is applied to the compass to correct its position in azimuth to that determined during the evaluation period, and a second torque is applied to level the compass.

The device is now ready for the third mode of operation, i.e., the computation or evaluation mode illustrated in Fig. 4. This mode is initiated by closing switch 90 which starts timer 92. It is during this period that the mean tilt per unit time is determined from which the azimuth error of the compass is computed according to the theory heretofore outlined. In this stage, it will be seen that the meridian or azimuth torquer 10 is still controlled by the earth's rate resolver 76 so as to keep the gyro azimuth error $\phi$ constant by eliminating the azimuthal effect of the earth's rotation $\omega$ on the gyro. Since the rate of tilt of a free gyro depends not only upon the azimuth error but also upon the secant of the latitude (see Equation 6), a latitude correction must also be employed to determine azimuth error from rate of tilt. Therefore, the signal from the pendulum is again fed through amplifier 24 into the same latitude computer 37 as employed in the compass phase of Fig. 2, which has a cosine resolver 66 positioned from the latitude setting handle 68 to introduce the reciprocal cosine factor $$\frac{1}{\cos \lambda}$$

again by virtue of the feedback connection around amplifier 56. Hence, the output of amplifier 56 may also be expressed as a function of sec $\lambda$ which, it may be observed, is one of the known, settable and hence constant terms of Equation 6. A preferred form of secant computer is shown in the above-mentioned patent to Herbert Harris, No. 2,546,156, dated March 27, 1951, for Computer Apparatus, in which details of this type of resolver may be found. Reference may also be had to the prior application of Edmund B. Hammond, Jr., Serial No. 323,437 for Gyro Roll Compensating System, filed December 1, 1952.

Figure 7:
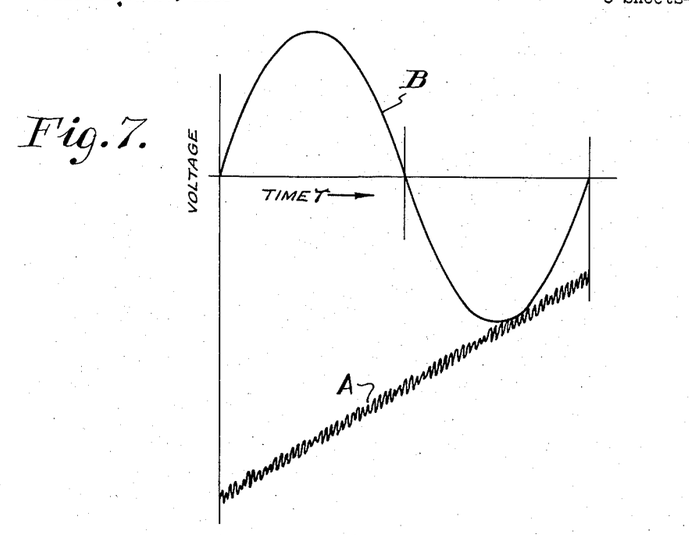

The means by which the tilt per unit time or tilt rate $\dot{\theta}$ is derived will now be described, reference being made to Figs. 4, 7 and 8. In Fig. 7, the wavy curve represents the signal from the tilt pendulum 12 and is shown as increasing from some initial angular value, which is initially made zero during the preparation mode, to some larger value at the end of a predetermined time period T, which, in the present case, is four minutes as determined by the timer 92 of Fig. 4, as will be described below. The wavy character of the signal illustrated by curve A is due to random accelerations or "noise" produced by vehicle movement. The derivation of tilt rate $\dot{\theta}$ from measures of tilt angle is based on the principle that if there are no other accelerations acting on the pendulous mass except that due to gravity, a measurement of the difference in the tilt at the beginning and end of a predetermined time interval divided by the time interval will provide the desired measure of the average tilt rate. If a continuous measurement of tilt is made over the time period T, the problem is simplified because the function to be averaged may be integrated with respect to time with the result being divided by the time. In the particular case under consideration, however, where random accelerations do act on the pendulum over the entire measuring period, the accuracy of the latter measure is improved by introducing the above described weighting function which allows particular sections of the measuring interval to contribute more to the total integral than others. Mathematical analysis has shown that the theoretical weighting function applicable in the present instance has a form very similar to a sine wave so that in order to simplify the practical application a sine wave is used. This curve is shown at B in Fig. 7. It should be readily apparent that since the weighting function is in the form of a sine wave its effect alone on the output of the integrator 30 will be substantially zero. The curve C illustrated in Fig. 8 shows the character of the tilt signal after it has been multiplied by the sine curve weighting function. Thus, in the computation mode of operation, the final angular position of the output shaft of the integrator 30 is proportional to the average tilt rate of the gyro which, in accordance with Equation 6 above, is equal to the azimuthal error $\phi$ between the spin axis of the gyro and the geographical meridian.

The timer mechanism (Fig. 4) comprises essentially a motor 94 run at a constant speed and connected through reduction gearing to one face 96 of a slip friction clutch. The other face 97 is normally locked by lock pin 98 so that it is held against rotation. To the shaft 97' of face 97 is secured a rotatable winding of the sine resolver or sine curve multiplier 58. When the button 90 is momentarily pressed, the solenoid 100 controlled therefrom withdraws the lock pin 98 so that the face 97 starts to rotate at a speed of a quarter revolution per minute so that in four minutes one complete revolution will have been made. At this time a detent 102 on said clutch face 97 closes the switch 104. During this interval the modified tilt signal, further modified by the sine wave weighting function as described above and appearing on leads 106, has been causing the integrator 30 to operate, thus shifting the position of the control transformers 40 and 42 through an angle which is proportional to the tilt of the gyro at time zero, i.e., the beginning of the computation mode which is zero, and its tilt at the end of the four minute time period. This angle is therefore proportional to the average tilt rotate $\dot{\theta}$ of the gyro spin axis, that is, so many degrees per minute as described above. This angular position of the control transformers therefore represents the computed error $\phi$ of the compass in accordance with Equation 6. The closing of switch 104 terminates the computation period and initiates the correction period at which time the error computed and stored in the control transformers 40, 42 by operation of the integrator is actually put into the compass.

In the correction period (Fig. 5), the synchros 9 and 9' on the gyro are connected to the control transformers 40 and 42 in the computing device which has, of course, been displaced during the four minute computation period by the output of the sine resolver 58. If there is any disagreement, therefore, between the gyroscope which has been operating as a directional gyroscope and the azimuth position as indicated by the computer, an error signal $\phi$ is produced actuating compass error indicator 110 and also fed through mixer 82, switch 74 and earth rate corrector 76, into the azimuth torque amplifier 80, and applied to the gyro to bring it onto the meridian position as found by the computer. Since the vertical earth rate correction is maintained in all modes of operation of the compass, the addition of the error signal φ results in a greatly increased corrective signal so that the compass will be brought quickly to the meridian.

The levelling torquer 11 is rendered responsive to the pendulum signal at the beginning of the correction mode of operation to quickly re-level the gyro spin axis. This is automatically accomplished with the closing of detent-operated switch 104 in the timing mechanism 92. Closing of this switch energizes relay solenoid 114', switch arm 114 being moved to the left into contact with contact 101 thereby energizing relay 17. Relay 17 in turn moves switch 15 to the right thereby establishing a direct connection between the output of pendulum pre-amplifier 24 and the input to the levelling torquer amplifier 62. It will be noted that in the correction mode this signal is passed to the levelling torquer amplifier unattenuated since the resistor 64, which provides the normal levelling sensitivity, is shorted out. In this manner, the gyro is quickly brought onto the meridian, level and ready to be switched back to operation as a normal gyro compass, this normal mode being illustrated in Fig. 2 as hereinbefore described. At this time, switch 23 should be moved to its down or L.S. position and the zeroing button 29 pressed or closed. This operation serves to place the linear synchro 38 in follow-up on itself and thereby zeroes the integrator 30. Thus, both indicators 86 and 110 should read zero, the system then being ready for normal compass operation. The main azimuth reference-compass switches may then be thrown back to their "compass" positions thereby completing the entire cycle of operation of the system.

From the foregoing, the operation of my improved azimuth reference device should be apparent. While my device is primarily a gyro-compass having all the characteristics of an accurate gyro-compass, not only may it also be operated in the manner described as a quick means for setting the compass on the meridian but, when so employed, it constitutes in reality a new method of locating the meridian and hence constitutes a new form of azimuth reference device. In this device, the gyro is not north-seeking, but the meridian is determined by measuring the rate of tilt of the gyro over a predetermined period and from this, determining the angle that the device is off the meridian, from which, of course, the meridian may be determined assuming the approximate latitude to be known. Since during this time the gyro operates as a free gyro, it is unaffected by vehicle speed and hence one large source of error in gyro-compasses is avoided. Since the vehicle speed error becomes quite large in aircraft, my novel form of azimuth reference device has a marked advantage for use in high speed aircraft over the standard form of gyro-compass.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of quickly setting a gyro-compass on the meridian which consists in eliminating meridian-seeking and damping controls for a predetermined period, but continuing to apply a torque about the horizontal axis to eliminate the effect of the vertical component of earth rate, producing a signal proportional to the average rate of tilt of the gyro taking place during said period, calculating therefrom the compass error causing such rate of tilt at that latitude, correcting the compass for such error and finally resuming meridian-seeking and damping controls.

2. The method of quickly setting a gyro-compass on the meridian which consists in levelling the compass, in eliminating meridian-seeking and damping controls for a predetermined period, but continuing to apply a torque about the horizontal axis to eliminate the effect of the vertical component of earth rate, producing a signal proportional to the average rate of tilt of the gyro taking place during said period, calculating therefrom the compass error causing such rate of tilt at that latitude, correcting the compass for such error, again levelling the compass, and finally resuming meridian-seeking and damping controls.

3. The method of quickly setting a gyro-compass on the meridian which consists in eliminating meridian-seeking and damping controls for a predetermined period, but continuing to apply a torque about the horizontal axis to eliminate the effect of the vertical component of earth rate, producing a signal proportional to the average rate of tilt of the gyro taking place during said period secured by employing a sine curve weighting factor, calculating therefrom the compass error causing such rate of tilt at that lattitude, correcting the compass for such error, and finally resuming meridian-seeking and damping controls.

4. In an azimuth reference device, a free gyroscope, means for applying a torque about the horizontal axis thereof proportional to the vertical component of earth's rate whereby to maintain the azimuthal position of said gyro substantially fixed, means for producing a signal proportional to the tilt of the gyro about said horizontal axis, means for averaging said tilt signal over a period of time whereby to produce a signal proportional to the average rate of tilt during such period, said latter signal being proportional to the azimuthal error of the device, and means responsive to the latter signal for resetting said device in accordance therewith whereby to eliminate said azimuthal error.

5. An azimuth reference device as claimed in claim 4, in which said averaging means includes a weighting factor having means for multiplying said signal by one cycle of a sine curve.

6. An azimuth reference device comprising a gyro-compass having a gravitational factor and an electrical azimuth torquer normally controlled thereby for applying a meridian-seeking torque about the horizontal axis of the compass, a levelling electrical torquer also normally controlled thereby for applying a damping torque about the vertical axis thereof, an earth rate resolver means for also controlling said azimuth torquer in accordance with the vertical component of earth rate, and means for temporarily eliminating the control of said azimuth torquer and the levelling torquer from said gravitational factor but retaining the control of said azimuth torquer from said earth rate resolver means, whereby the device may be made to operate at will as either a gyro-compass or directional gyro, each corrected for the vertical component of earth's rate.

7. An azimuth reference device as claimed in claim 6, also having a latitude cosine resolver, means operated therefrom for modifying the control of said azimuth torquer to normally maintain the period of the compass constant for all latitudes, and means also operated therefrom for maintaining the rate of tilt due to the horizontal component of earth's rate constant, regardless of the latitude, during the directional gyro mode of operation.

8. A meridian-finding device, comprising a directional gyro, means for measuring the tilt thereof about the horizontal axis of said gyro, means including a cosine resolver for modifying said measure in accordance with the cosine of the latitude, means for deriving from said modified measure the average rate of tilt of said gyro at said latitude, said modified measure being proportional to the angular deviation of said device from the meridian, and means for controlling said gyro in accordance with said average rate of tilt whereby to eliminate said angular deviation and thereby place said gyro on the meridian.

9. A meridian-finding device as claimed in claim 8 also having means for correcting said gyro for azimuth drift due to the vertical component of earth rate before, during and after the operating of said rate of tilt deriving means.

10. A meridian-finding device as claimed in claim 9, in which said rate of tilt deriving means includes a single cycle of a sine curve as a weighting factor which is multiplied by the output of the cosine resolver.

11. In a meridian-seeking gyro compass system, a gyroscope having freedom about vertical and horizontal axes, means for providing a signal in accordance with the vertical component of earth's rate, means responsive to said signal for precessing said gyro about said vertical axis in accordance therewith whereby to maintain the azimuthal position of said gyro substantially fixed relative to the earth, means for producing a signal proportional to the tilt of the gyro about said horizontal axis, computer means responsive to said tilt signal for providing a correction signal proportional to the average rate of tilt of the gyro about said horizontal axis, and means responsive to said correction signal for precessing said gyro about said vertical axis in accordance therewith whereby quickly to place said gyro on the meridian.

References Cited in the file of this patent
UNITED STATES PATENTS

| | | |
|---|---|---|
| 2,419,948 | Haskins | May 6, 1947 |
| 2,677,194 | Bishop | May 4, 1954 |

OTHER REFERENCES

"Practical Analysis" (F. A. Willers), published by Dover Publication, Inc. (New York), copyright 1948.